Sept. 8, 1964     R. J. PUSZTAY     3,148,005
SIDE THRUST BUTTON FOR CARRIAGE ROLLER
Filed April 27, 1962
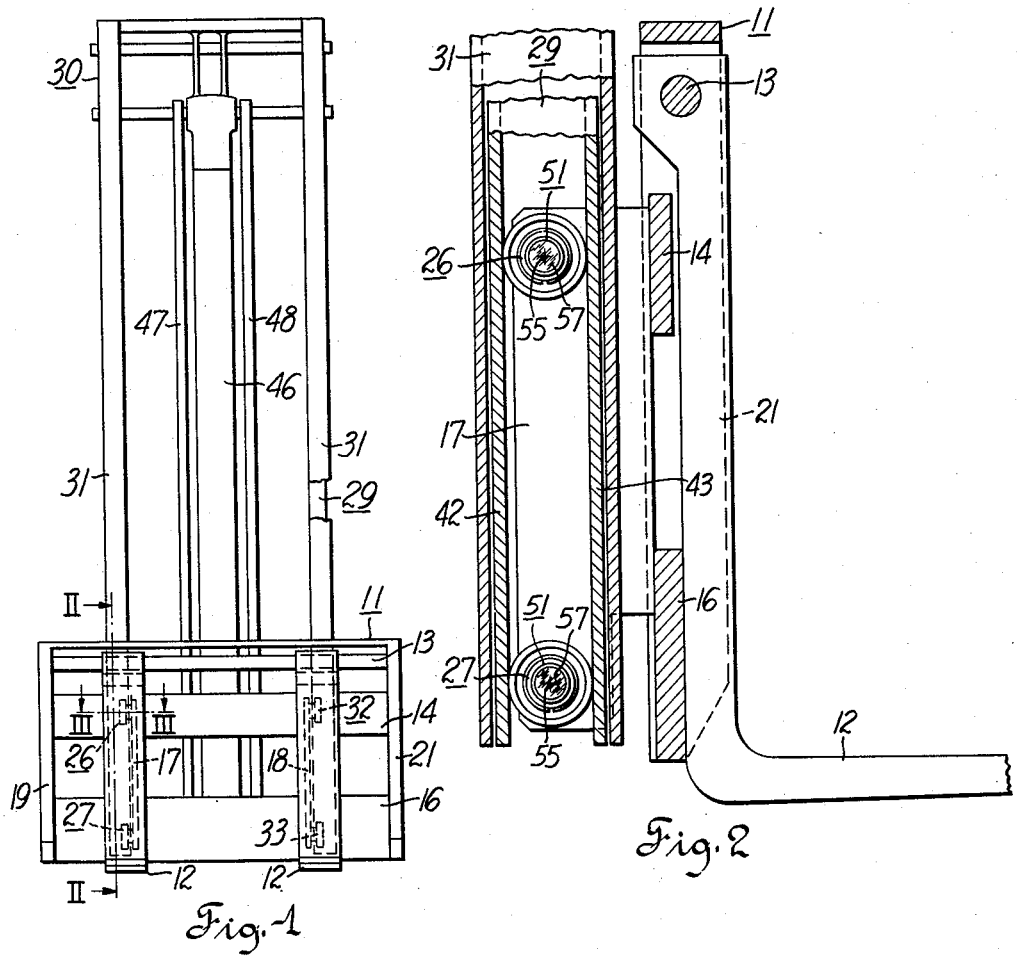
Fig. 1
Fig. 2
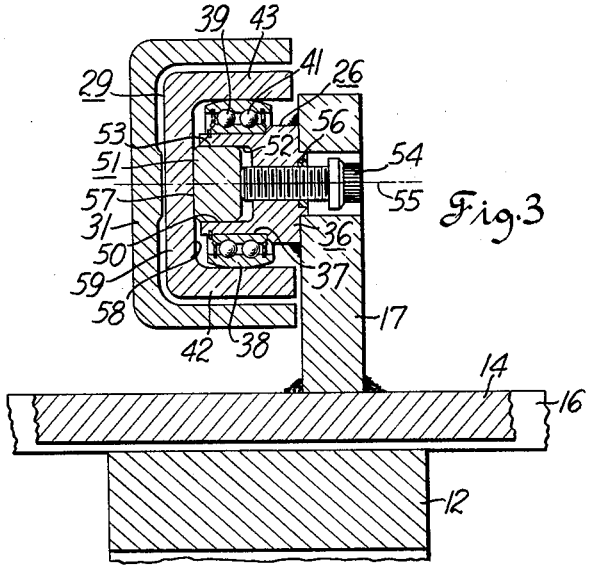
Fig. 3
Inventor
Russell J. Pusztay
By Charles L. Schwab
Attorney

3,148,005
SIDE THRUST BUTTON FOR CARRIAGE ROLLER
Russell J. Pusztay, Dolton, Ill., assignor to Allis-Chalmers Manufacturing Company, Milwaukee, Wis.
Filed Apr. 27, 1962, Ser. No. 190,653
2 Claims. (Cl. 308—6)

This invention relates to the provision of means for transmitting the side thrust of a lift truck carriage to the mast which guides its vertical movement.

Heretofore various devices have been employed to transmit the side thrust from the lift truck carriage to the channel members of the mast assembly. For instance, Samuel T. Comfort, Patent 2,881,031, issued April 7, 1959, shows a side thrust roller mounted within a carriage roller. Such previous arrangement has not proven entirely satisfactory, inasmuch as the side thrust roller has a line contact with the channel member and under severe operating conditions the yield point of the mast channel material may be exceeded thereby resulting in deformation of the channel members. Under eccentric loading conditions of the carriage grooving or indenting of the mast channels may occur thereby necessitating costly replacement. Other disadvantages of the prior art carriage side thrust devices include high cost and difficulty or lack of adjustment.

It is an object of this invention to provide a side thrust device for a lift truck carriage and mast wherein the side thrust bearing area is sufficiently large to avoid deformation of the supporting mast section.

It is a further object of this invention to provide a side thrust member which is adjustable, without disassembly, to compensate for wear and which is low in cost.

It is a further object of this invention to provide a carriage side thrust member which adjustably fits within the stud which mounts the carriage roller and provides a surface contact with the mast member supporting the carriage.

It is a further object of this invention to provide a cylindrical side thrust member within a cylindrical opening of a carriage roller mounting stud which is not only adjustable along its axis but is free to rotate to insure even wear of its circular end thrust surface.

These and other objects and advantages of this invention will be apparent to those familiar with the art when the following description is read in conjunction with the drawings in which:

FIG. 1 is a front view of a lift truck carriage and mast assembly;

FIG. 2 is a section view taken along the line II—II in FIG. 1; and

FIG. 3 is a section view taken along line III—III in FIG. 1.

Referring to FIGS. 1, 2 and 3, a lift truck carriage 11 supports a pair of forks 12 on a transverse rod 13 in a conventional manner. The carriage includes a pair of transversely extending plates 14, 16 welded to end members 19, 21 which in turn support rod 13. A pair of roller support members 17, 18 are welded to and extend rearwardly from plates 14, 16. The carriage is guided in the channel members 29 by carriage roller assemblies 26, 27 mounted on carriage roller support 17 and by carriage roller assemblies 32, 33 secured to carriage roller support 18. Channel members 29 are a part of the inner section of the mast 30 and slide vertically in channel members 31 of the outer section of the mast.

Referring to FIG. 3, carriage roller assembly 26 includes a stud 36 welded to roller support 17. The stud 36 carries an inner raceway 37 and an outer raceway or roller 38 is supported on raceway 37 by two rows of antifriction balls 39, 41. The outer raceway serves as a rolling bearing member in relation to the flanges 42, 43 of the inner channel 29. The roller assembly also includes a novel side thrust button 51 in its free end and an adjusting screw 54 therefor.

The carriage is raised and lowered upon expansion and contraction of a ram 46 through use of chains 47, 48. During such raising and lowering, the carriage is stabilized against lateral tilting of the carriage by the side thrust buttons 51 mounted in cylindrical openings or cavities 52 in the studs 36 of roller assemblies 26, 27, 32, 33. The cylindrically shaped side thrust button has a running fit at its cylindrical bearing surface 53 with the cylindrical mounting surface 50 of opening 52 and is axially shiftable along its axis 55 by an adjusting screw 54 having threaded engagement with stud 36. A conventional thread locking device 56 is employed to prevent the screw 54 from working loose from its adjusted position. The button 51 has a flat end surface 57 on the end extending outside the opening 52 which makes surface contact with the inner surface 58 of the web 59 of channel 29. The thrust button is preferably made of material having a low coefficient of friction but with sufficient strength to withstand the loads to which it is subjected. For instance, an alloy consisting of 10.5% aluminum, 3.0% iron and 86.5% copper has been found suitable as a material for the side thrust button.

The illustrated side thrust roller assembly is simple in construction, gives long life, is easy to adjust and is relatively inexpensive. The side thrust button 51 is free to rotate within opening 52 of the stud 36 thereby insuring even wearing characteristics.

Although only a single embodiment of this invention has been illustrated and described it is not intended to limit this invention except as necessitated by the scope of the appended claims.

What is claimed is:

1. In a side thrust roller assembly for a lift truck carriage the combination comprising: a stud secured to said carriage, a carriage roller rotatably supported on said stud, a cylindrical opening formed in the free end of said stud coaxial to said roller and presenting an inward facing cylindrical mounting surface, a button having a cylindrical bearing surface slidingly engaging said cylindrical mounting surface and a flat end surface disposed at right angles to the axis of said cylindrical bearing surface, and means for axially adjusting said button relative to said stud without removal of said button from said stud.

2. The structure set forth in claim 1 wherein said means for axially adjusting said button includes a set screw in threaded engagement with said stud and in axially abutting relation to said button.

References Cited in the file of this patent
UNITED STATES PATENTS 2,648,401    Frischmann _____ Aug. 11, 1953
2,881,031    Comfort _____ Apr. 7, 1959